(12) United States Patent
MacNeil et al.

(10) Patent No.: US 9,475,467 B2
(45) Date of Patent: Oct. 25, 2016

(54) VEHICLE CONVEYOR WITH FLEXIBLE SAFETY COVER AND COMPONENT THEREOF

(71) Applicant: Ryko Canada, Inc., Barrie (CA)

(72) Inventors: Daniel J. MacNeil, Barrie (CA); Ereth McKnight-MacNeil, Vars (CA)

(73) Assignee: Ryko Canada, Inc., Barrie, CA (US)

( * ) Notice: Subject to any disclaimer, the term of this patent is extended or adjusted under 35 U.S.C. 154(b) by 0 days.

(21) Appl. No.: 14/673,090

(22) Filed: Mar. 30, 2015

(65) Prior Publication Data

US 2015/0274429 A1 Oct. 1, 2015

Related U.S. Application Data

(60) Provisional application No. 61/972,793, filed on Mar. 31, 2014.

(51) Int. Cl.
*B65G 19/00* (2006.01)
*B60S 3/00* (2006.01)

(52) U.S. Cl.
CPC ................ *B60S 3/004* (2013.01)

(58) Field of Classification Search
CPC ... B65G 47/78; B65G 2207/40; B60S 3/004; B61B 5/025; B61B 10/00
USPC ........... 198/735.3, 735.4, 860.4, 719, 722; 104/172.2, 172.3, 194; 134/123, 124
See application file for complete search history.

(56) References Cited

U.S. PATENT DOCUMENTS

| | | | | | |
|---|---|---|---|---|---|
| 414,227 | A | * | 11/1889 | Leake | A63B 55/60 104/194 |
| 420,233 | A | * | 1/1890 | Higgins | A63B 55/60 104/194 |
| 677,456 | A | * | 7/1901 | Larson | A63B 55/60 104/194 |
| 3,724,390 | A | * | 4/1973 | Beer | B61B 10/04 104/172.3 |
| 4,266,482 | A | * | 5/1981 | Barber | B61B 10/04 104/172.3 |
| 4,864,936 | A | * | 9/1989 | Rietsch, Jr. | B62D 65/18 104/172.1 |
| 6,186,073 | B1 | * | 2/2001 | Reitsch, Jr. | B60S 3/004 104/162 |
| 6,422,153 | B1 | | 7/2002 | Reitsch, Jr. | |
| 8,028,628 | B2 | | 10/2011 | Ennis | |
| 2010/0300323 | A1 | * | 12/2010 | Ennis | B60S 3/004 104/172.3 |

* cited by examiner

*Primary Examiner* — James R Bidwell
(74) *Attorney, Agent, or Firm* — Smart & Biggar

(57) ABSTRACT

A vehicle conveyor for conveying a wheeled vehicle along a track using a roller may include a track with an opening for passage of a roller from a surface to an underside of the track. The conveyor may also include a door that is pivotable, about a pivot that is below track level, between a closed position and an open position. In the closed position, the door may cover the opening. In the open position, the door may uncover the opening. The conveyor may further include a gap in the track, adjacent to the opening, for accommodating the door when pivoted to the open position. A flexible cover may cover the gap and may be free to ride up and onto at least a portion of the door that extends above a surface of the track as the door pivots from the closed position to the open position.

22 Claims, 12 Drawing Sheets

VEHICLE CONVEYOR WITH FLEXIBLE SAFETY COVER AND COMPONENT THEREOF

CROSS-REFERENCE TO RELATED APPLICATION

This application claims priority from U.S. provisional application No. 61/972,793 as filed Mar. 31, 2014, the contents of which are hereby incorporated herein by reference.

FIELD OF TECHNOLOGY

The present disclosure relates to a vehicle conveyor, and more particularly to a vehicle conveyor with a flexible safety cover and a component thereof.

BACKGROUND

Vehicle conveyors may be used for various purposes. One purpose may be to convey wheeled vehicles through a tunnel type vehicle wash system. A vehicle wash conveyor may convey a vehicle through various wash stations, such as a pre-soak station, a soap dispenser, a tire washing station, a sprayer station, one or more rotating brushes, a pre-rinse station, a wax applicator station, a rinsing device, and/or a drying station for example.

A vehicle conveyor may comprise an elongate track flanked by a pair of rails which act as a tire guide. A tire of a vehicle (e.g. a car whose transmission is in neutral) may be pushed along the track, within the tire guide, by a longitudinally advancing roller to cause the vehicle to roll forwardly from the entrance end to the exit end of the conveyor. The roller may be driven by an endless drive, such as a chain or belt, which is situated below track level. The roller may be attached to the endless drive by an upstanding tab or link that protrudes through a longitudinal slot in the track. The longitudinal slot may guide the roller along the track as the roller pushes a vehicle wheel.

The track of a vehicle conveyor may have an opening near an exit end of the vehicle conveyor to allow the roller to drop below track level. This may allow the endless drive to carry the roller around a rotating sprocket or drum back towards the entrance end of the vehicle conveyor.

Vehicle conveyors may be used outside of the vehicle wash industry as well.

SUMMARY

In one aspect of the present disclosure, there is provided a vehicle conveyor for conveying a wheeled vehicle along a track using a roller, the vehicle conveyor comprising: a track; an opening in the track for passage of a roller from a surface of the track to an underside of the track; a door pivotable between a closed position and an open position, the door covering the opening when in the closed position, the door uncovering the opening when in the open position, the door being pivotable about a pivot that is below track level; a gap in the track, adjacent to the opening, for accommodating the door when pivoted to the open position; and a flexible cover for covering the gap, the flexible cover being free to ride up and onto at least a portion of the door that extends above a surface of the track as the door pivots from the closed position to the open position.

In another aspect of the present disclosure, there is provided a vehicle conveyor for a wheeled vehicle, comprising: a track for a wheel of the vehicle; a gap in the track; a flexible cover for covering the gap, the flexible cover being attached at one end to the track and being free at the other end, a moving part operable to move into the gap, from the free end of the flexible cover towards the attached end of the flexible cover, with at least a portion of the moving part protruding above a surface level of the track, wherein the flexible cover is adapted to ride up and onto the protruding portion of the moving part while covering the gap.

In another aspect of the present disclosure, there is provided a component of a vehicle wash conveyor, the component comprising: a flexible cover sized and shaped for covering a transverse gap in a track of the vehicle wash conveyor, the flexible cover having a notch at one end; an attachment portion configured for attaching the flexible cover to the vehicle wash conveyor so that the notch is aligned with a longitudinal slot in the track and so that the flexible cover is free to ride up and onto a moving part that moves into the gap in a direction of movement that is from the notched end of the flexible cover towards the attachment portion of the flexible cover.

DETAILED DESCRIPTION

Figure 1:
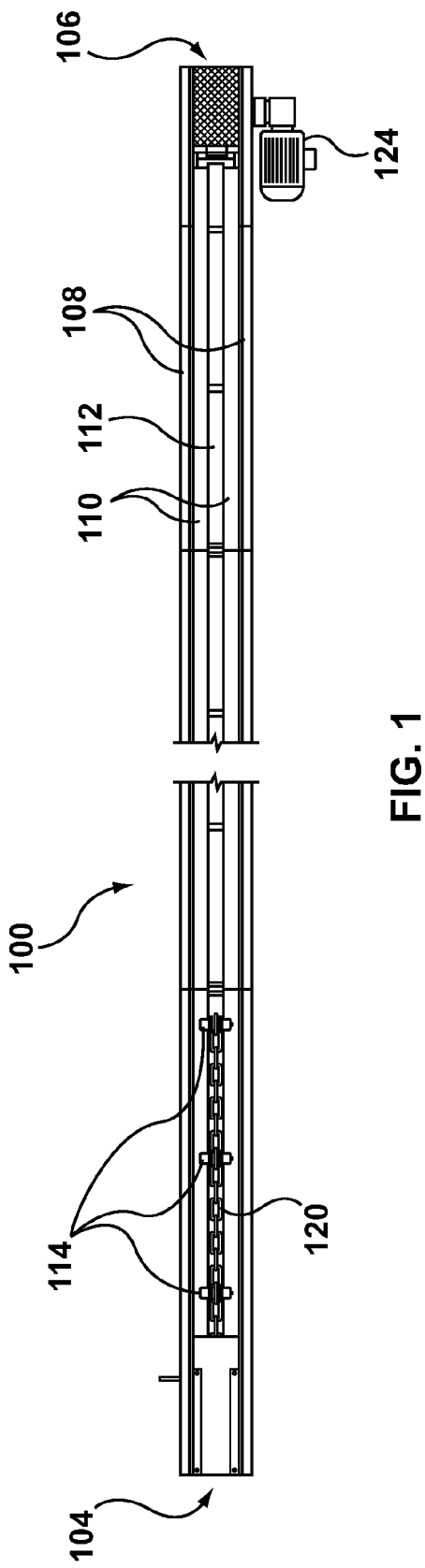
FIG. 1 is a plan view of a vehicle conveyor as may be used in a vehicle wash system.
Figure 2:
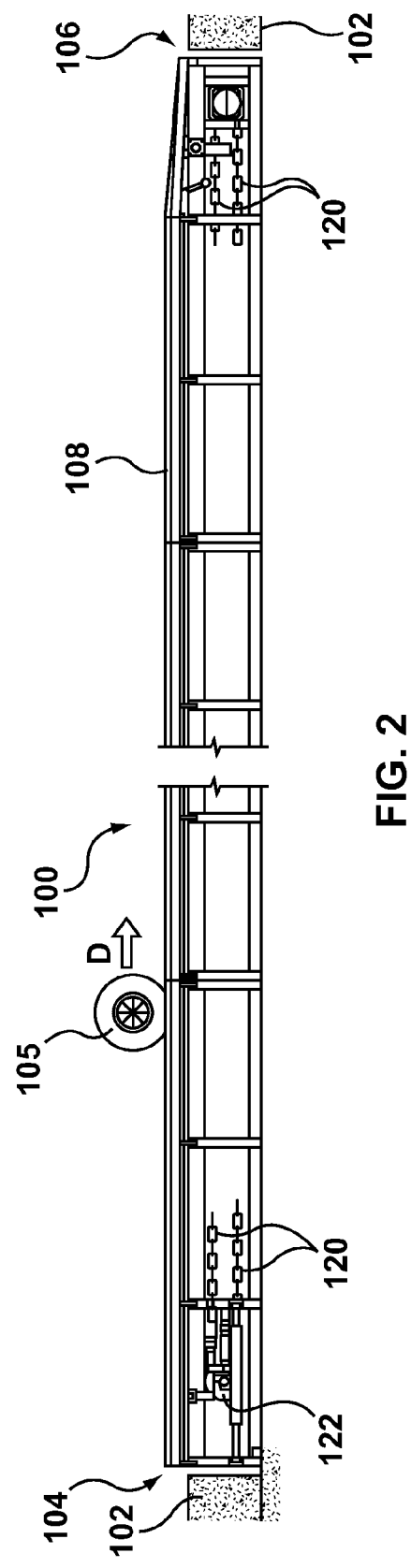
FIG. 2 is a side elevation view of the vehicle conveyor of FIG. 1.

With reference to FIGS. 1 and 2, a vehicle conveyor 100 is illustrated in top plan view and in side elevation view, respectively. Vehicle conveyor 100 may be used to convey a vehicle through various wash stations within a vehicle wash tunnel, and as such may be referred to as a vehicle wash conveyor, or alternatively simply as a conveyor. The vehicle conveyor 100 may be substantially embedded within a floor 102 (see FIG. 2) when installed.

Vehicle conveyor 100 has an entrance end 104 into which a wheel 105 of a wheeled vehicle enters the conveyor and an exit end 106 from which the wheel of the vehicle exits the conveyor. A pair of upstanding rails 108 form a tire guide within which the vehicle tire rolls as it is conveyed downstream (forwardly, i.e. in direction D—see FIG. 2). For clarity, the terms "downstream" and "upstream" in this description should be understood as being relative to the conveyance direction D. A slotted track 110 (FIG. 1) provides a flat surface upon which the vehicle wheel rolls. A series of rollers 114 may be used to push vehicle wheels downstream from the entrance end 104 to the exit end 106 of the track 110.

The rollers 114 may be driven by an endless drive 120, to which the rollers may be attached via links protruding upwardly through a longitudinal slot 112 in track 110. The endless drive 120 may for example be an endless chain having rigid links pivotably interconnected with pins. The endless drive is situated below track level, i.e. below the level of track 110, in the present embodiment. The endless drive extends along substantially the entire length of the conveyor 100 between a sprocket (not expressly illustrated in FIGS. 1 and 2) at the exit end 106 and a freely rotating take-up drum 122 at the entrance end 104. The sprocket and drum are situated below track level in the present embodiment. The sprocket may be rotatably driven by electric motor 124 to cause the endless drive 120 to move. The electric motor 124 may be selectively activated, e.g. when a vehicle is detected at the entrance end 104 of the conveyor 100.

A flexible sheet 200 (see FIG. 1) covers a portion of the track 110 at the exit end of the conveyor. The purpose and function of the flexible sheet 200 will be described below.

Figure 3:
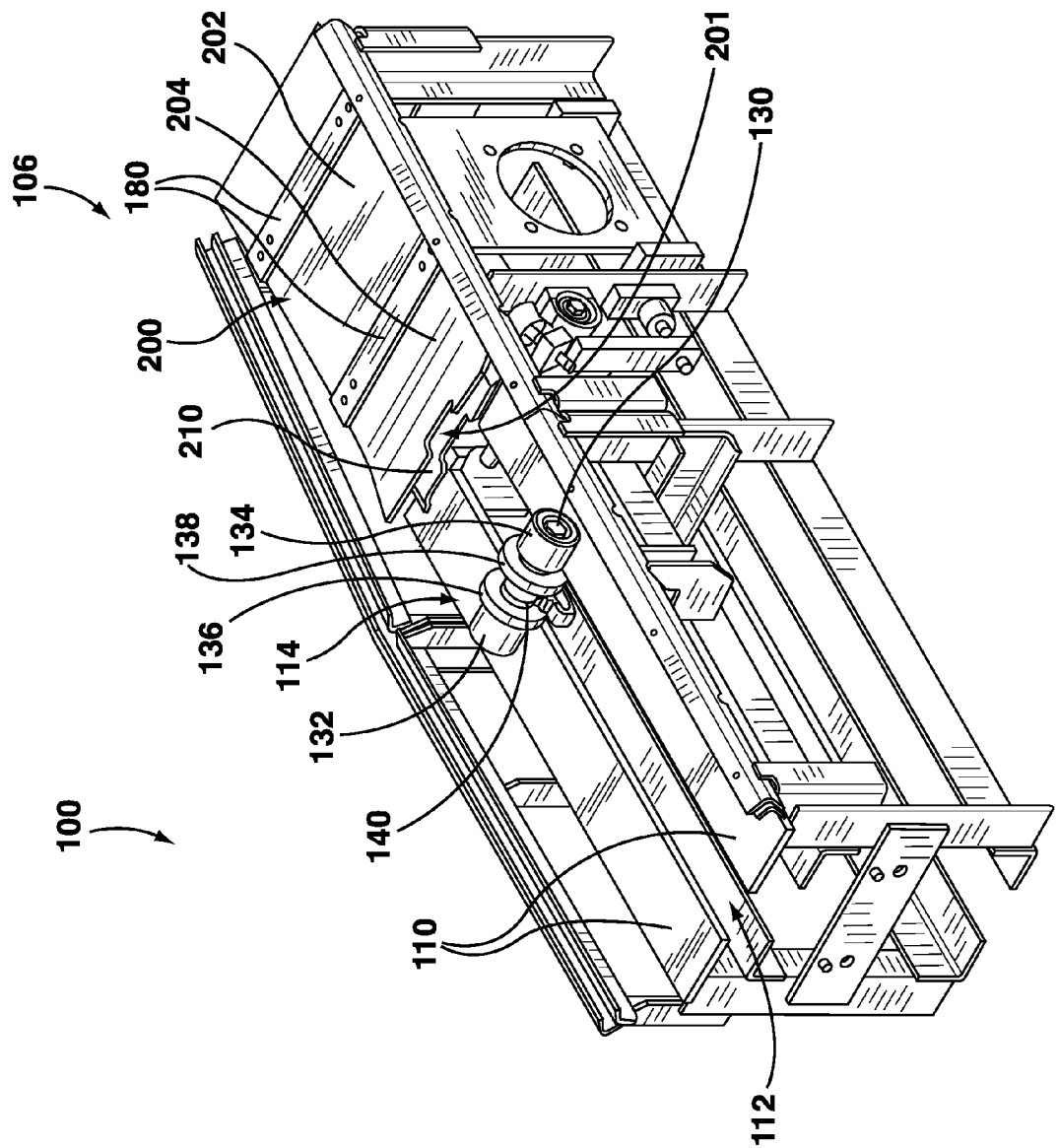
FIG. 3 is a perspective view of an exit end portion of the vehicle conveyor of FIG. 1.

FIG. 3 illustrates the exit end 106 of the conveyor 100 in perspective view. A single example roller 114 is illustrated on the surface of the track 110. The roller 114 has an axle 130 that is oriented transversely with respect to the track 110. Two support wheels 132, 134 at opposite ends of the axle 130 ride along the track 110 surface on opposite sides of the slot 112. Two pusher wheels 136, 138, for pushing a vehicle wheel along the track 110, are situated on the axle 130 between the support wheels 132, 134. The pusher wheels 136, 138 are free to rotate in an opposite direction from the support wheels 132, 134, so as to complement a direction of rotation of the vehicle wheel that is being pushed. The diameter of the pusher wheels 136, 138 is larger than that of the support wheels 132, 134 in the present embodiment. As such, a lower portion of each pusher wheel 136, 138 is situated below the surface of the track 110, i.e. is at least partially received within the slot. This may help the slot 112 to act as a guide for the roller 114. A link 140 attaches the axle 130 to the endless drive 120 (not illustrated in FIG. 3).

The flexible sheet 200 partially covers a safety door 210, which is only partially visible in FIG. 3. The purpose and function of these components will be described below.

Figure 4:
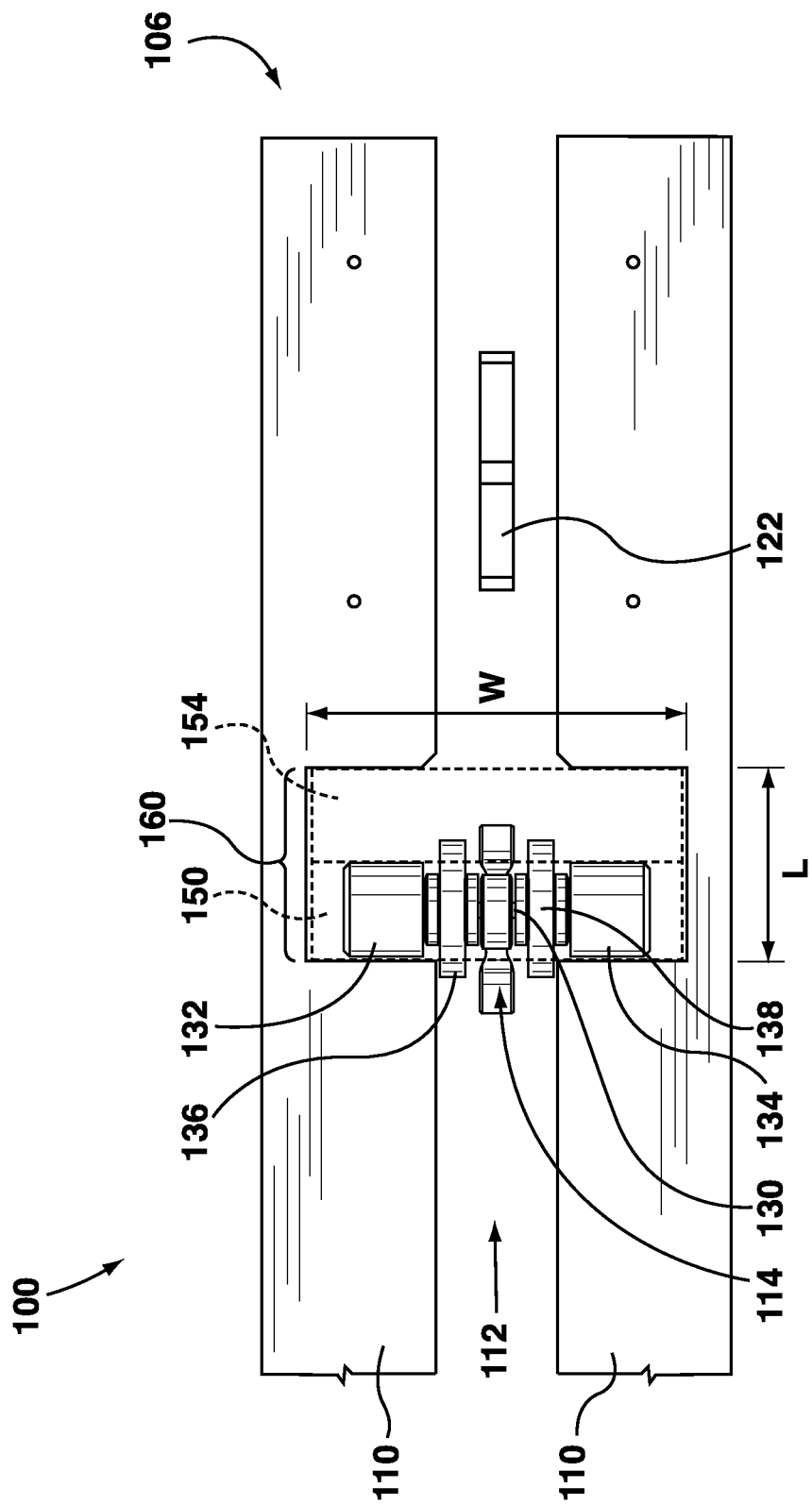
FIG. 4 is a top view of the track of the conveyor of FIG. 1 with certain conveyor components omitted.

FIG. 4 shows a top view of the track 110 at the exit end 106 of the conveyor 100, with the flexible sheet 200 and safety door 210 omitted. As illustrated, the track 110 has an opening 150 therein (shown in dashed lines in FIG. 4). The opening 150 is for passage of a roller 114 therethrough, from a surface of the track to an underside of the track. In other words, the opening 150 allows the roller 114 to drop below track level when it is no longer required for pushing the vehicle wheel. The roller 114 may then be carried by the endless drive 120, below track level, around a rotating sprocket 122 and back towards the entrance end of the conveyor 110.

In the present embodiment, the opening 150 is generally rectangular and is sized to allow the roller 114 to fit therethrough. It will be appreciated that, in the illustrated embodiment, the lagging (i.e. upstream-most) portion of the pusher wheels 136, 138 may actually pass through the slot 112 immediately upstream of the opening 150 (i.e. slightly outside the rectangular dashed-line boundary in FIG. 4 denoting opening 150) as the roller 114 drops. In other words, although most of the roller 114 drops through the opening 150 that is depicted as a rectangular area in FIG. 4, portions of the pusher wheels 136, 138 may extend beyond that boundary as the roller 114 drops below track level. The roller 114 is nevertheless considered to "pass through the opening 150" in the sense that most of the roller passes through the rectangular boundary.

In FIG. 4, it can be seen that the opening 150 is encompassed within a larger cutout area 160 in the track 110 having a width W and a length L. The cutout area 160 additionally encompasses a gap 154 that is adjacent to (immediately downstream of) the opening 150. The gap 154 exists to periodically accommodate the safety door 210 (not illustrated in FIG. 4; partially visible in FIG. 3) when the door opens. The purpose of the safety door 210 is to cover the opening 150 except when the opening must be uncovered to allow a roller 114 to drop through the opening. In a default closed position (shown in FIG. 3), the safety door 210 covers opening 150, with the gap 154 (not visible in FIG. 3) remaining uncovered by the door 210. In an open position, the opening 150 is uncovered, and the safety door 210 is accommodated within the gap 154. As will be described, in the present embodiment it is the roller 114 that pushes the safety door 210 from the closed position to the open position, to allow the roller 114 to drop downwardly through the opening 150. The gap 154 of the present embodiment is transverse to the track 110 and spans a majority of a width of the track.

Figure 5:
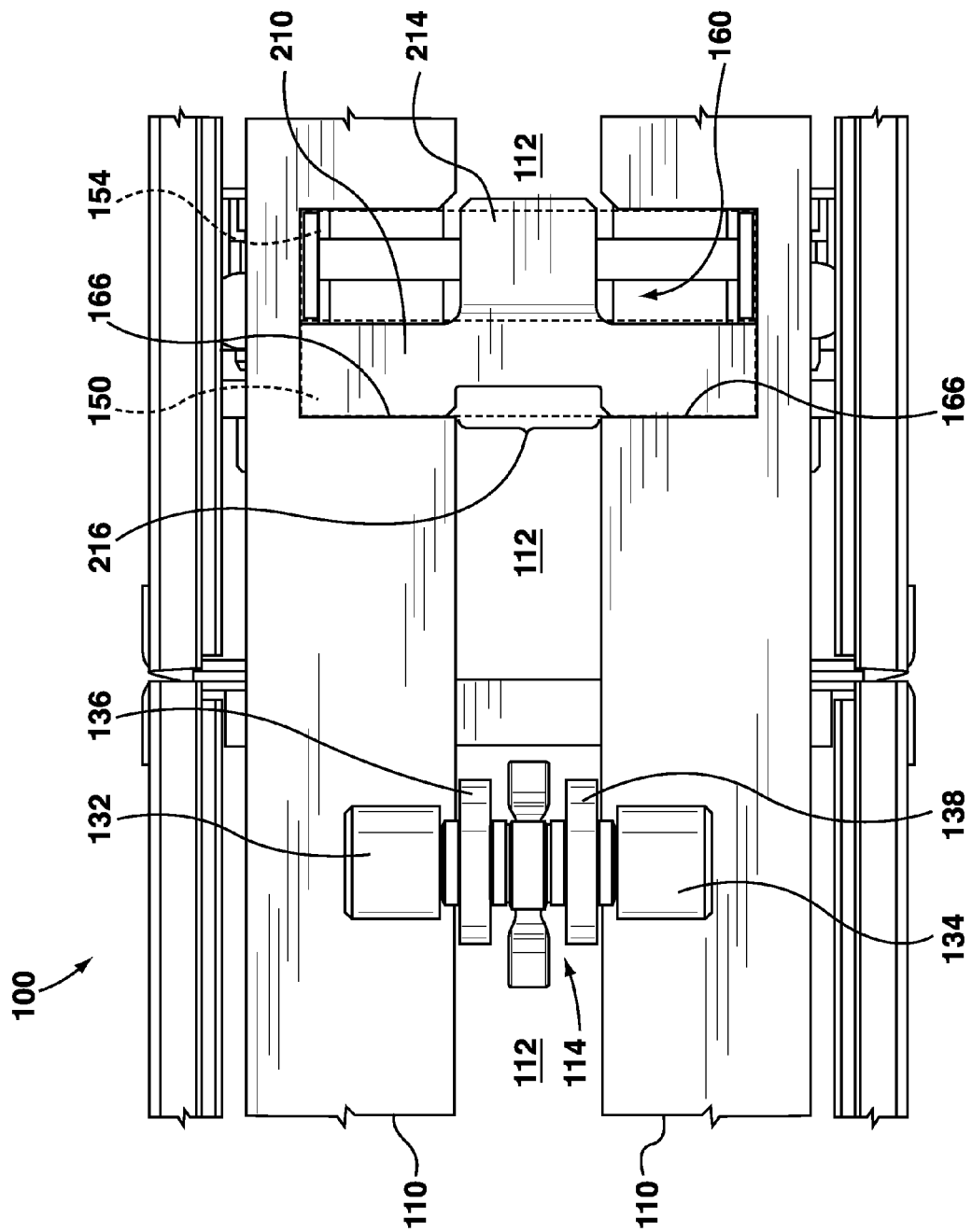
FIG. 5 is a top view of a portion of the conveyor of FIG. 1 showing a safety door in a closed position with certain components omitted.

FIG. 5 illustrates a portion of the conveyor 100 near the exit end 106 in top view with the safety door 210 in the closed position. The flexible sheet 200 is omitted from FIG. 5 for clarity. FIG. 5 is perhaps best understood when viewed in conjunction with FIG. 6, which illustrates the exit end 106 of the conveyor 100 in side elevation view, and FIG. 7, which illustrates the safety door 210 component in isolation from the conveyor 100. The safety door 210 may be sold, separately from the conveyor, as a discrete or replacement component.

Referring to FIG. 5, it can be seen that the safety door is substantially rectangular and substantially covers the opening 150 when the safety door is in the closed position. A notch 216 in the upstream edge of the safety door 210 is transversely aligned with the slot 112. The notch 216 is sized to accommodate a leading portion of the roller 114, specifically pusher wheels 136, 138. As will be appreciated, this may limit the degree to which the safety door must be pushed (i.e. moved into the gap 154) before the roller 114 will be able to fit between the safety door 210 and the upstream edge 166 of the opening 150 (i.e. of cutout 160 to be able to drop down through the opening 150 past the safety door 210. Despite the notch 216, the safety door 210 is still considered to cover the opening 150, in the sense that the opening 150 is substantially covered.

The notch 216 in the safety door 210 may have a lateral (transverse) extent similar to that of the slot 112. The depth (longitudinal extent) of the notch 216 may be chosen such that, when a roller 114, moving downstream, contacts the upstream edge of the safety door 210, all of the wheels 132, 134, 136 and 138 comprising the roller 114 come into contact with the safety door 210. That is, in the illustrated example, when the roller 114 contacts the safety door 210, the pusher wheels 136, 138 will be accommodated within the notch 216, while the support wheels 132, 134 will contact the upstream edge of the safety door 210 on either side of the notch 216. This may distribute the force of the impact across all four wheels 132, 134, 136 and 138. This is not necessarily true in all embodiments.

A tongue 214 extends from the safety door 210 in the downstream direction within slot 112. The purpose of the tongue 214 is two fold. Firstly, the tongue 214 occupies a central area of the gap 154 when the safety door 214 is closed, thereby preventing large objects from falling into the gap 154 if the flexible sheet 200 has been removed, e.g. during conveyor maintenance. Secondly, the tongue 214 may help a flexible cover portion of the flexible sheet 200 (discussed below) ride up and onto the safety door 214 as the safety door 214 is opened. The safety door 210 and tongue 214 may be formed from a single sheet of rigid material, e.g. steel. The tongue 214 may be angled slightly downwardly from the body 212. This may facilitate closure of the safety door 210 by operation of gravity (see below), at least in comparison to a similar tongue that is not downwardly angled.

Figure 6:
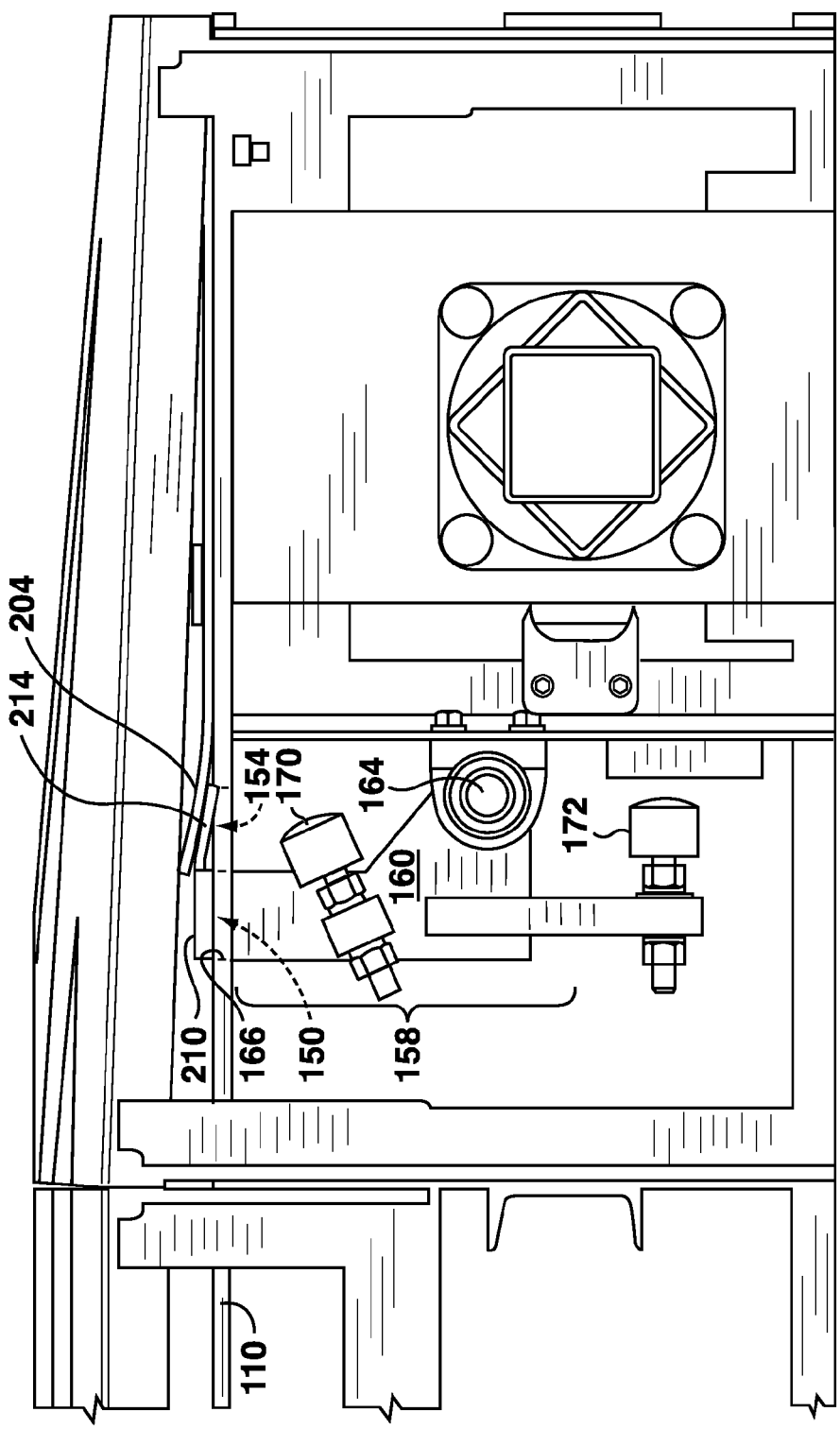
FIG. 6 is a side elevation view of the exit end of the conveyor of FIG. 1 showing the safety door in the closed position.

Referring to FIG. 6, the safety door 210 is shown in side elevation view in the closed position. As illustrated, the safety door 210 is vertically offset from the surface level of the track 110, i.e. occupies a horizontal plane above the surface of the track 110. The reason for this offset is that, in the present embodiment, each roller 114 is responsible for pushing the safety door 210 open for itself before the roller 114 drops below track level through the opening 150. If the safety door 210 were flush with the surface of the track 110, there may be a risk that the wheels 132, 134, 136 and/or 138 of roller 114 would try to "climb onto" the safety door 210 rather than push open the safety door 210. Offsetting the safety door 210 vertically reduces this risk by raising the impact point between the wheels(s) 132, 134, 136 and/or 138 and the safety door 210 to be on the leading side of the wheel(s). In other words, the wheel(s) are less likely to try to climb up onto the safety door 210 because doing so would require the wheel(s) to climb a step up from track level.

Referring to FIG. 6, it can be seen that the safety door 210 is supported from below by a support structure 158 for rotation about a pivot 164. The support structure 158 is best seen in FIG. 7.

Figure 7:
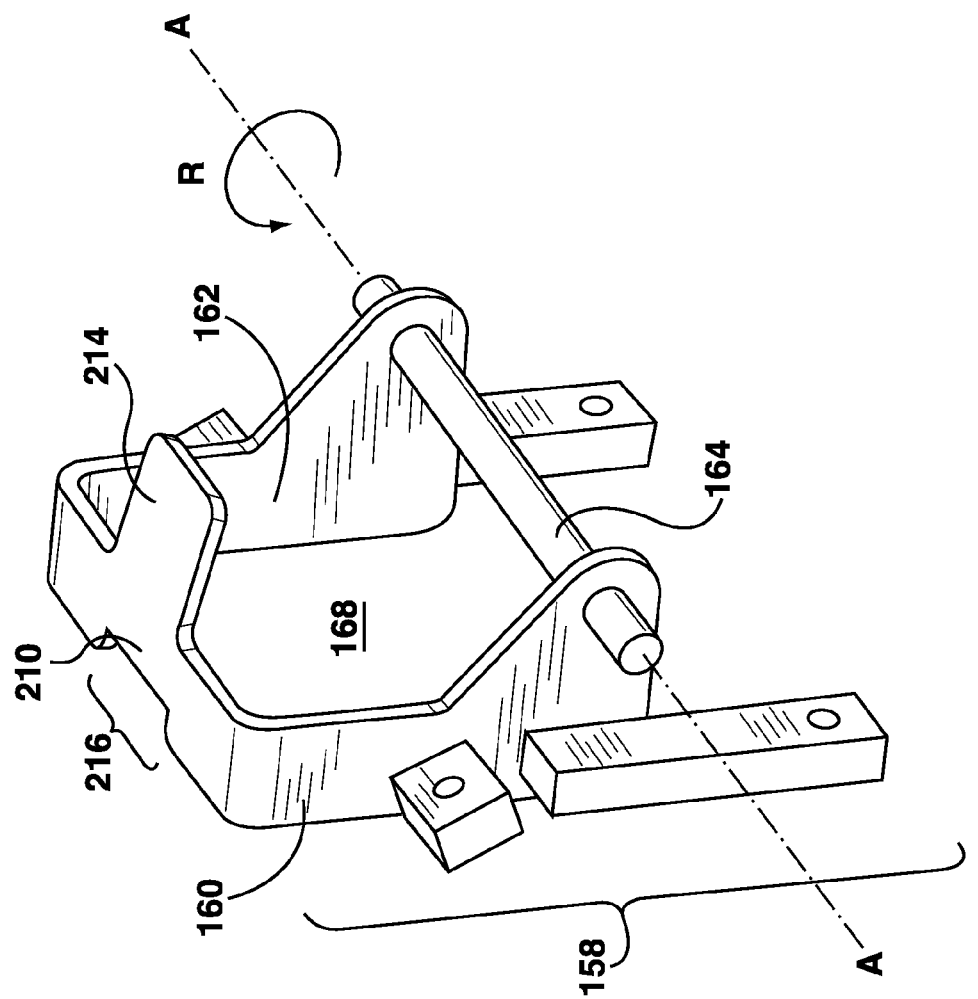
FIG. 7 is a perspective view of a safety door component of the conveyor of FIG. 1 in isolation.

FIG. 7 illustrates the safety door 210 and its support structure 158 in isolation from the conveyor 100. The safety door 210 and support structure 158 form a rigid unitary piece in this embodiment. The support structure 158 includes a pair of pivot arms 160, 162 for supporting the safety door 210 from below and to allow the safety door 210 to pivot about a pivot 164. The pivot arms 160, 164 may be formed from the same sheet of material as the safety door 210 and tongue 214, e.g. by bending the pivot arms 160, 162 at right angles to the safety door 210. In some embodiments, the pivot arms 160, 162 may be spaced apart to keep a central area 168 open for passage of endless drive 120 therethrough.

The pivot 164, which is a rod in the present embodiment, allows the safety door 210 to pivot about an axis A that is below track level and transverse to the track 110. In the present embodiment, the pivot 164 is offset, in the downstream direction, from the safety door 210. As a result of this offset, gravity operating on the safety door 210 and support structure 158 tends to cause a counter-clockwise rotation R about pivot 164, as viewed in FIG. 7, i.e. towards the upstream direction. This tendency keeps the safety door 210 in the closed position by default, with the upstream edges of the pivot arms 160, 162 resting against the upstream edge 166 of the opening 150 in track 110 (see FIG. 6). The safety door 210 is thus held closed by gravity by default.

A pair of adjustable bumpers 170, 172 (see FIG. 6) may be used to limit a range of pivoting of the safety door 210 or to partially or wholly cushion the opening or closing of the safety door 210.

Referring again to FIG. 5, it can be seen that the safety door 210 provides a safety benefit by covering substantially all of the opening 150 in the track. This may advantageously prevent objects from falling into the opening 150, thereby limiting risk of damage to mechanisms below track level. It may also reduce a risk of injury to a human operator from inadvertent insertion of a human body part, such as a foot, into the opening 150.

Despite this possible benefit, if the lateral regions of gap 154 (on either side of the tongue 214) were to remain open during conveyor operation when the safety door 210 is closed, other risks may arise. For example, a small object or human body part could inadvertently fall into, or be trapped within, the lateral regions of gap 154 when the safety door 210 is closed. This is despite the fact that the tongue 214, which occupies a central area of the gap 154 when the safety door 210 is closed, might keep large objects from falling into the gap 154. Serious injury could result if the safety door 210 were to open while a human body part were trapped within one of the lateral regions of the gap 154. There may also be a risk of equipment damage from trapped objects or objects falling below track level.

To limit this risk, a flexible cover is installed to so that gap 154 remains substantially or wholly covered regardless of whether the safety door 210 is in the open position or the closed position. This is illustrated in FIG. 8.

Figure 8:
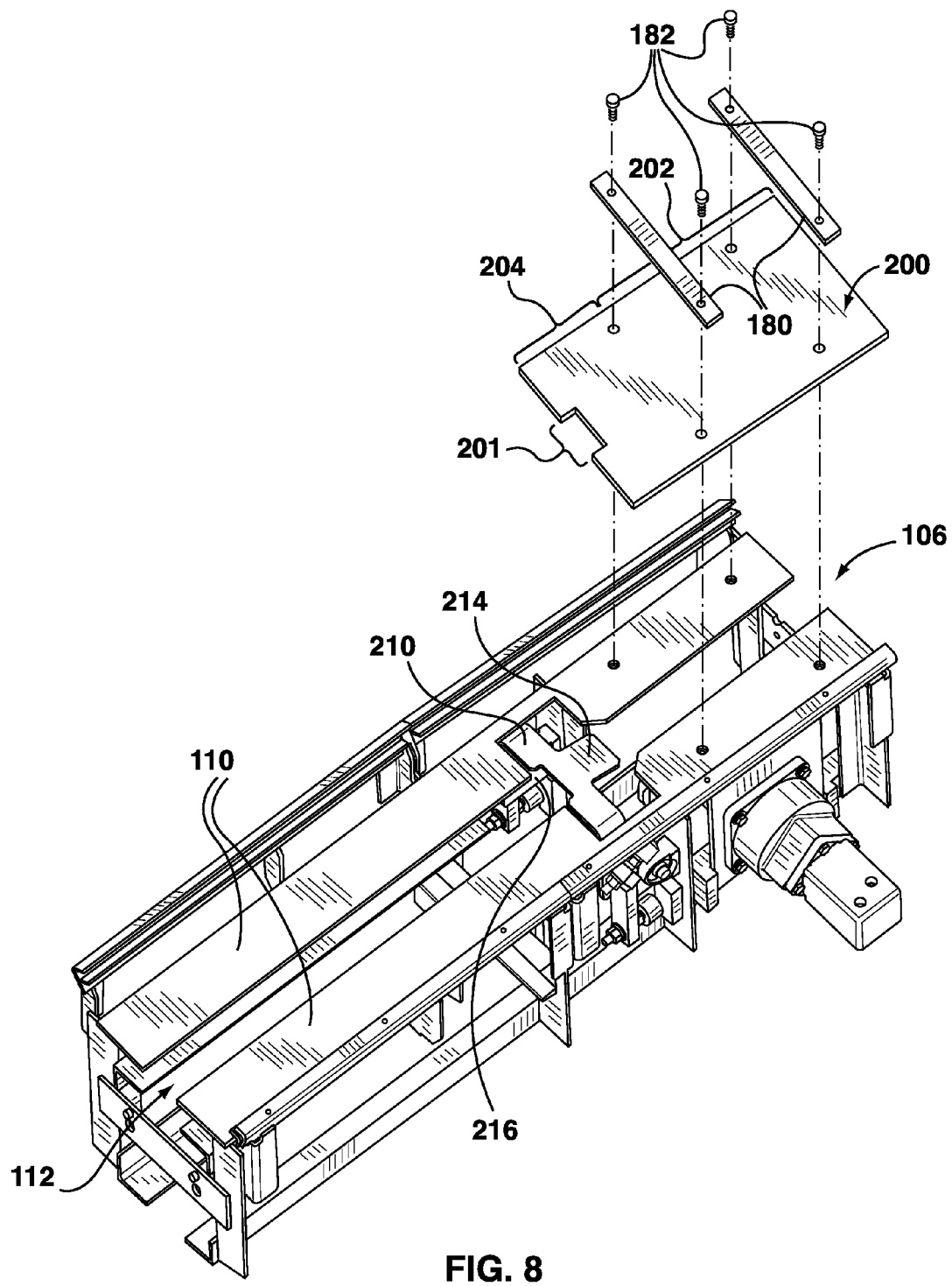
FIG. 8 is an exploded view of an exit end of the conveyor of FIG. 1.

FIG. 8 illustrates the exit end 106 of the conveyor 100 in exploded view. A flexible sheet 200 may be attached to the conveyor 100 by a pair of transverse bars 180 using fasteners 182 (e.g. screws, bolts, rivets, or other forms of removable or permanent fasteners). The fasteners 182 may pass through respective holes in the bars 180 and through respective holes in an attachment portion 202 of the sheet 200, i.e. a portion of the flexible sheet 200 by which it is attached to the conveyor 100, into holes in the track 110. The upstream portion of the flexible sheet is left free to act as a flexible cover 204 or flap. The flexible cover 204 covers the gap 154 even when closure of the safety door 210 uncovers the lateral areas of gap 154, thereby reducing the above-described risks.

Referring back to FIG. 3, the flexible sheet 200 is shown installed onto the conveyor 100 with the safety door 210 in the closed position. The attachment portion 202 of the sheet is held against the surface of the track 100 by the attached transverse bars 180. The portion of the sheet 200 that is upstream of the upstream-most bar 180 acts as a flexible cover 204 in this embodiment. The flexible cover 204 fully covers the tongue 214 and overlaps with a downstream edge of the safety door 210 in the closed position. In the present embodiment, the overlapping cover 204 bends slightly upwardly in view of the vertical offset of the safety door 210 above to the surface of the track 100. This is shown in FIG. 3 and in FIG. 6.

The flexible sheet 200 may be made from ultra-high molecular weight (UHMW) polyethylene for example. The thickness of the sheet may selected so that the flexible cover 204 can support at least part of the weight of a vehicle whose wheel is over the gap 154, but thin enough so that the flexible cover 205 may be slightly flexed or deflected when the safety door 210 is pivoted (e.g. between about ⅛ inch and about ½ inch thick). In general, the choice of material and thickness may be made to provide a compromise between adapting the flexible cover 203 to support at least part of the weight of the vehicle when the wheel 105 is over the gap 154 atop the flexible cover and permitting the flexible cover 204 to flex when the safety door 210 opens.

An upstream edge of the flexible cover 204 has a notch 201 (see FIGS. 3 and 8). The extent of the notch 201 may be similar to, or slightly larger than, that of notch 216 in the safety door 210. The upstream edge of the flexible cover 204 may be considered the distal edge, as it opposes the attachment portion 202, or as a free end of the flexible cover 204.

Figure 9:
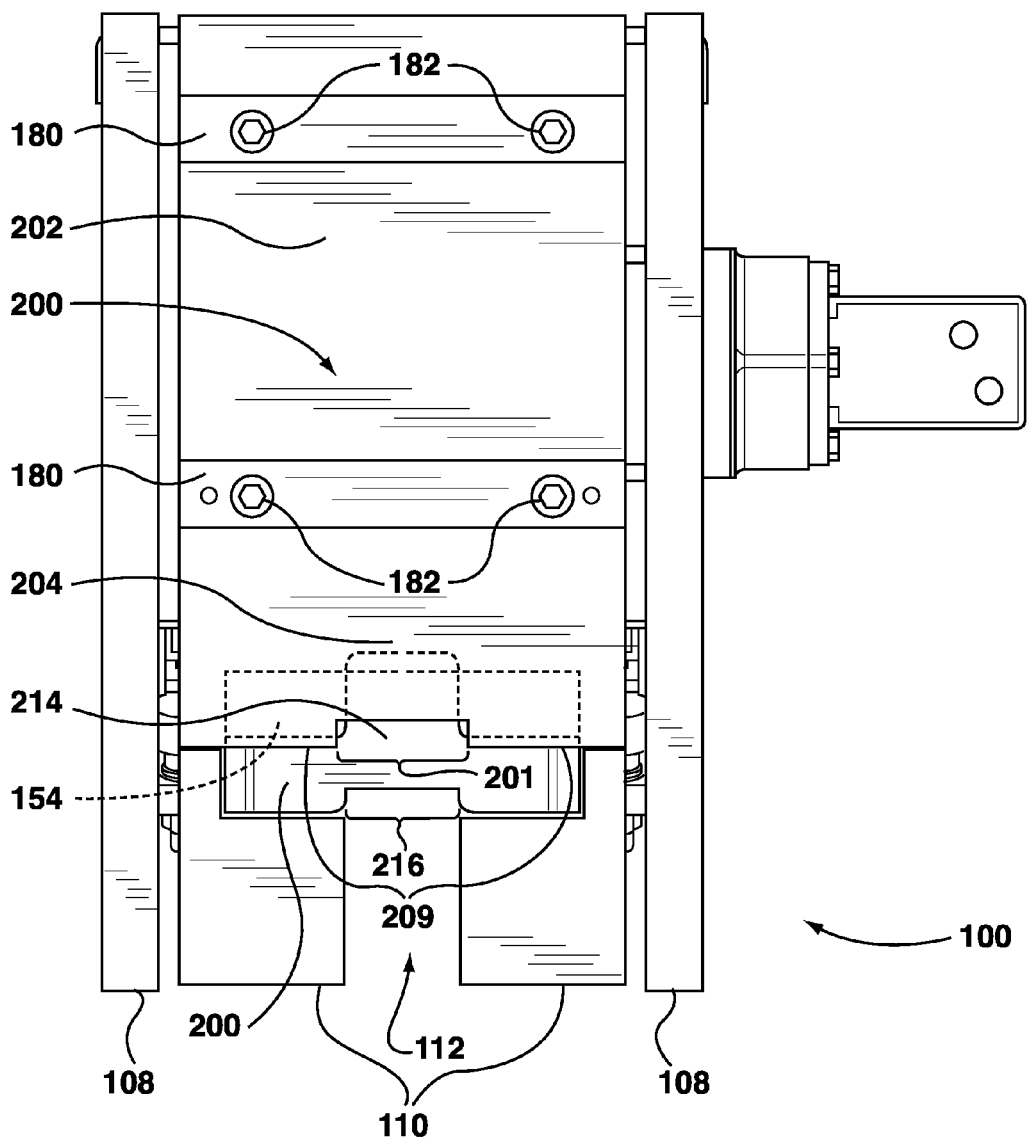
FIG. 9 is a top view of the exit end of the conveyor of FIG. 1.

FIG. 9 is a top view of the exit end 106 of conveyor 100 with the flexible sheet 200 installed. As illustrated, the attachment portion 202 of the sheet 200 is attached to the surface of the track by bars 180 and fasteners 182. The flexible cover 204 portion of the sheet 200 covers the gap 154. An upstream edge 209 edge of the flexible cover 204 overlays the downstream edge of the safety door 210, which is shown in the closed position. The notch 201 in the flexible cover 204 is transversely aligned with the longitudinal slot 112 in the track and with the notch 216 in the safety door 210. Longitudinally, the notch 201 is offset in the downstream direction from the notch 216 in the safety door 210 when the safety door is closed.

Like notch 216, the notch 201 may be sized to accommodate a portion of the roller 114, i.e. a leading portion of pusher wheels 136, 138, when the roller 114 contacts the safety door 210. As will be appreciated, the notch 201 in the flexible cover 204 limits a degree of upward flexing of the flexible cover 204 required for passage of the roller 114 through the opening 150.

Figure 10:
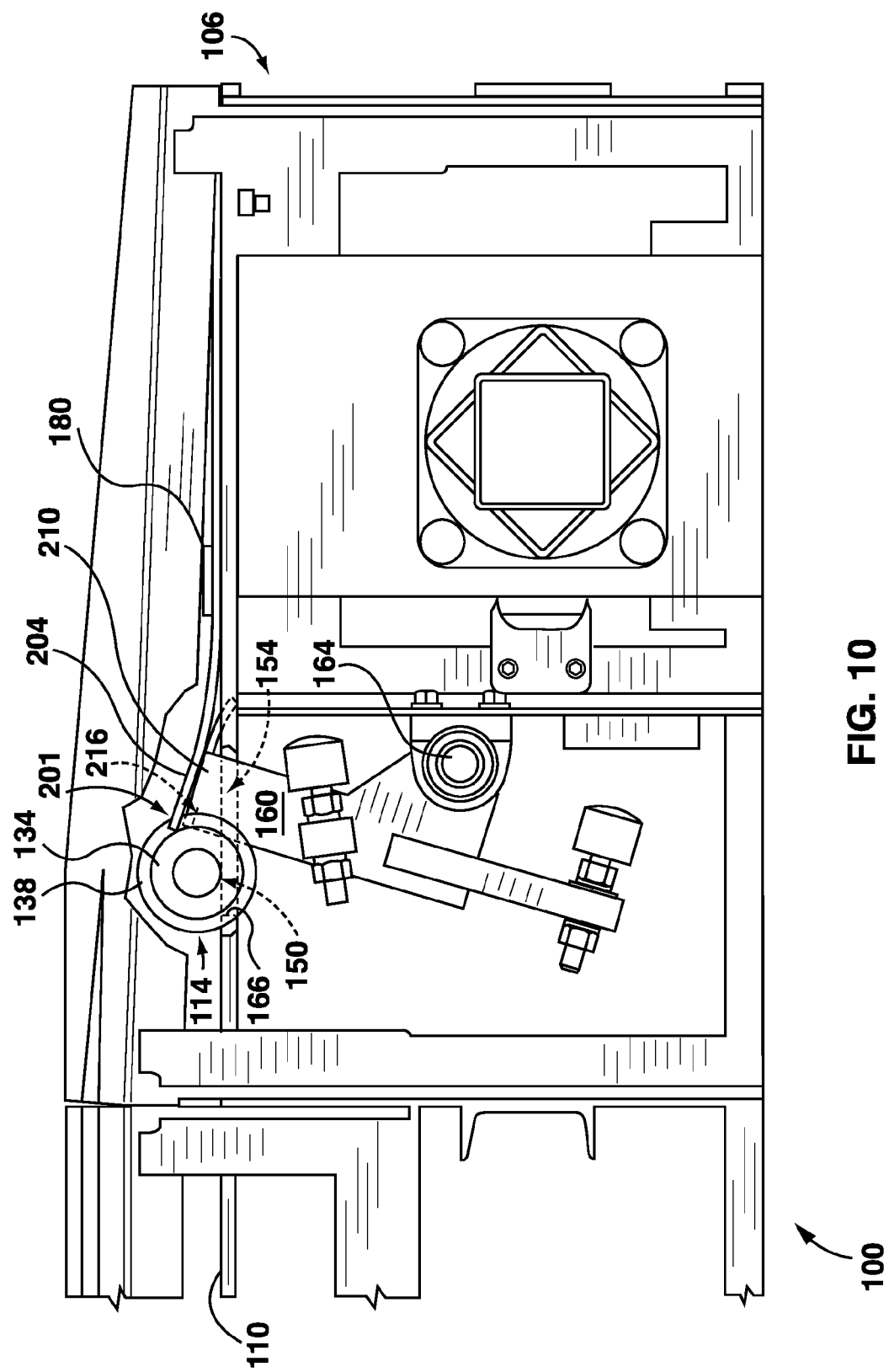
FIG. 10 is a side elevation view of the exit end of the conveyor of FIG. 1 showing the safety door in the open position.
Figure 11:
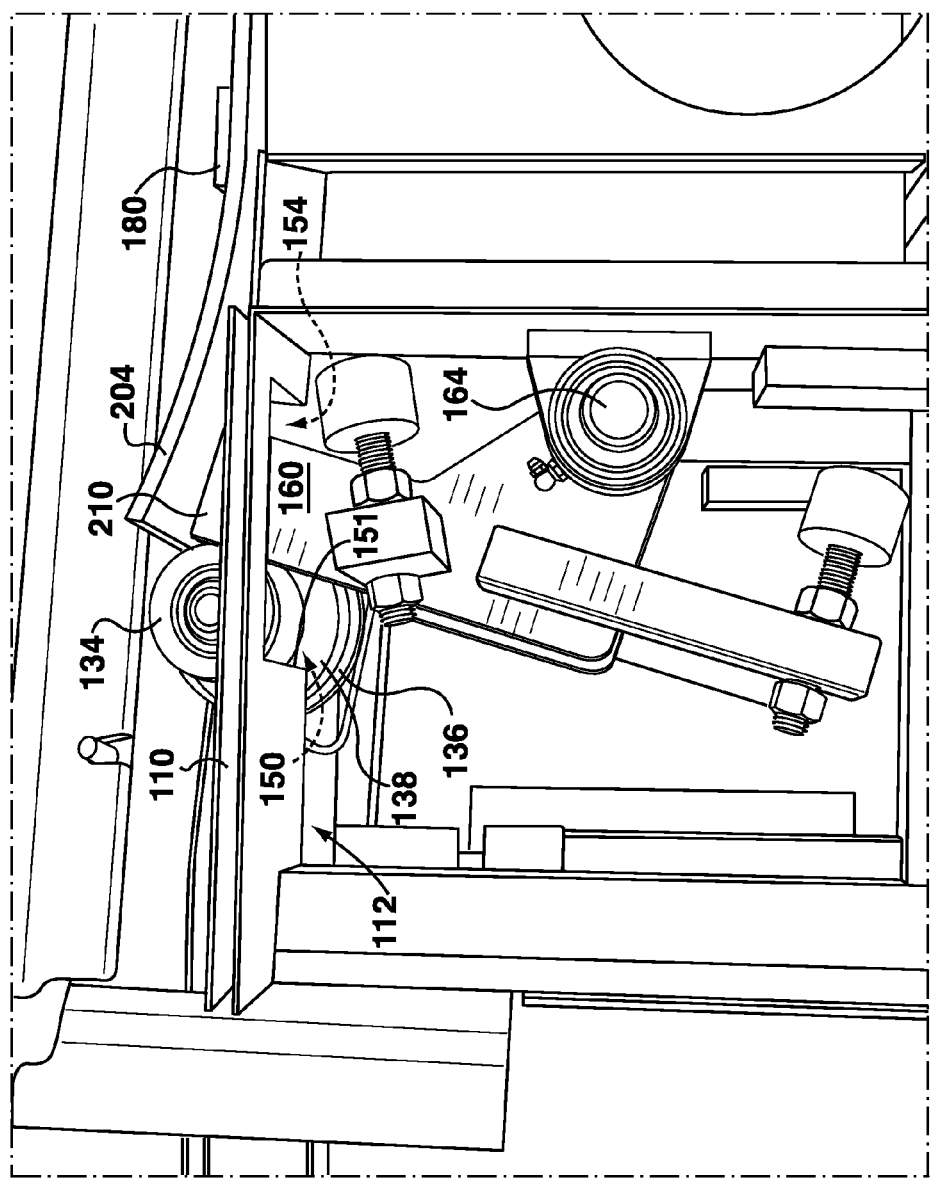
FIG. 11 is a perspective view of the exit end of the conveyor of FIG. 1 from below track level showing the safety door in the open position.
Figure 12:
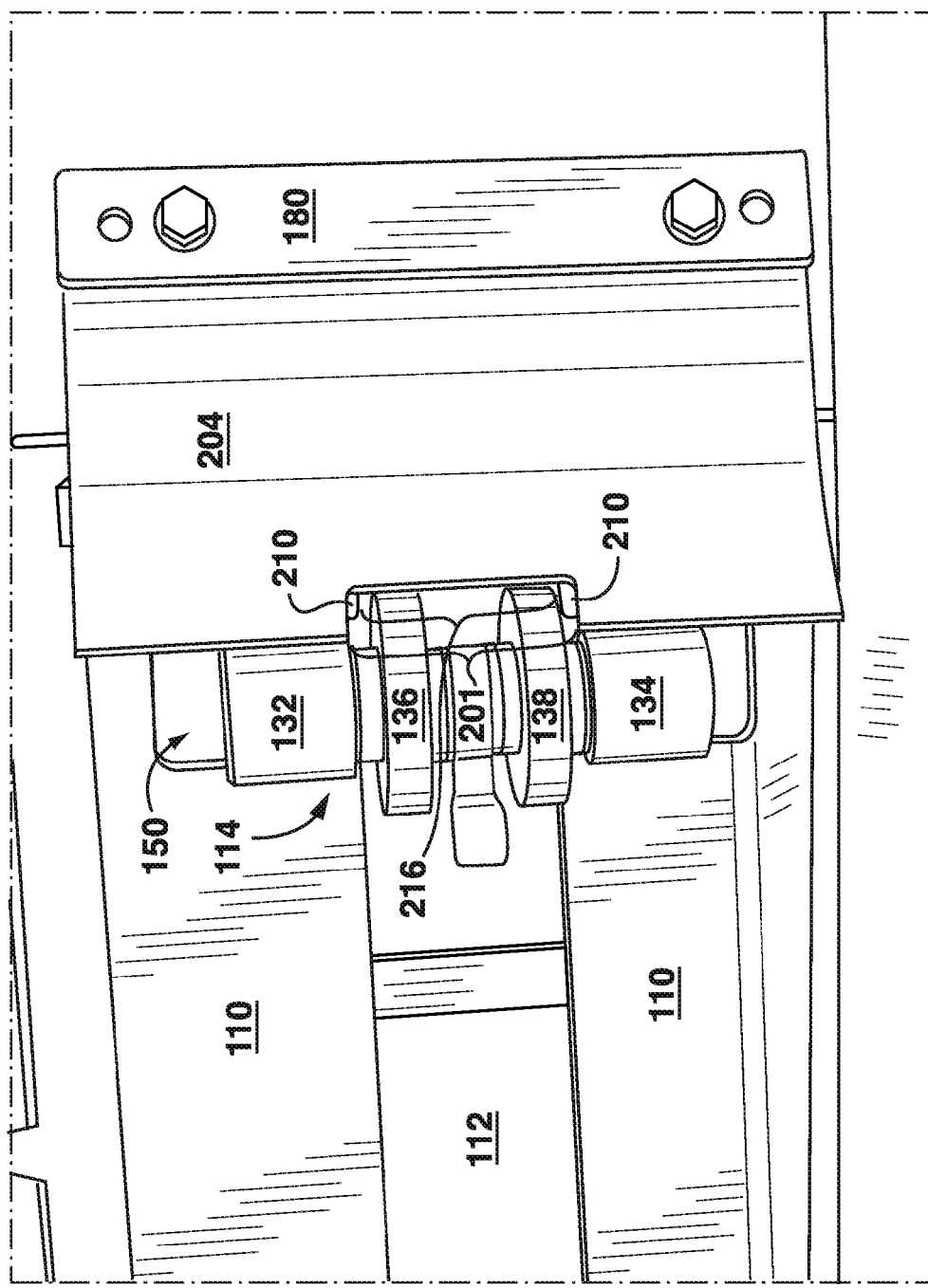
FIG. 12 is a top perspective view of the exit end of the conveyor of FIG. 1 showing the safety door in the open position.
Figure 13:
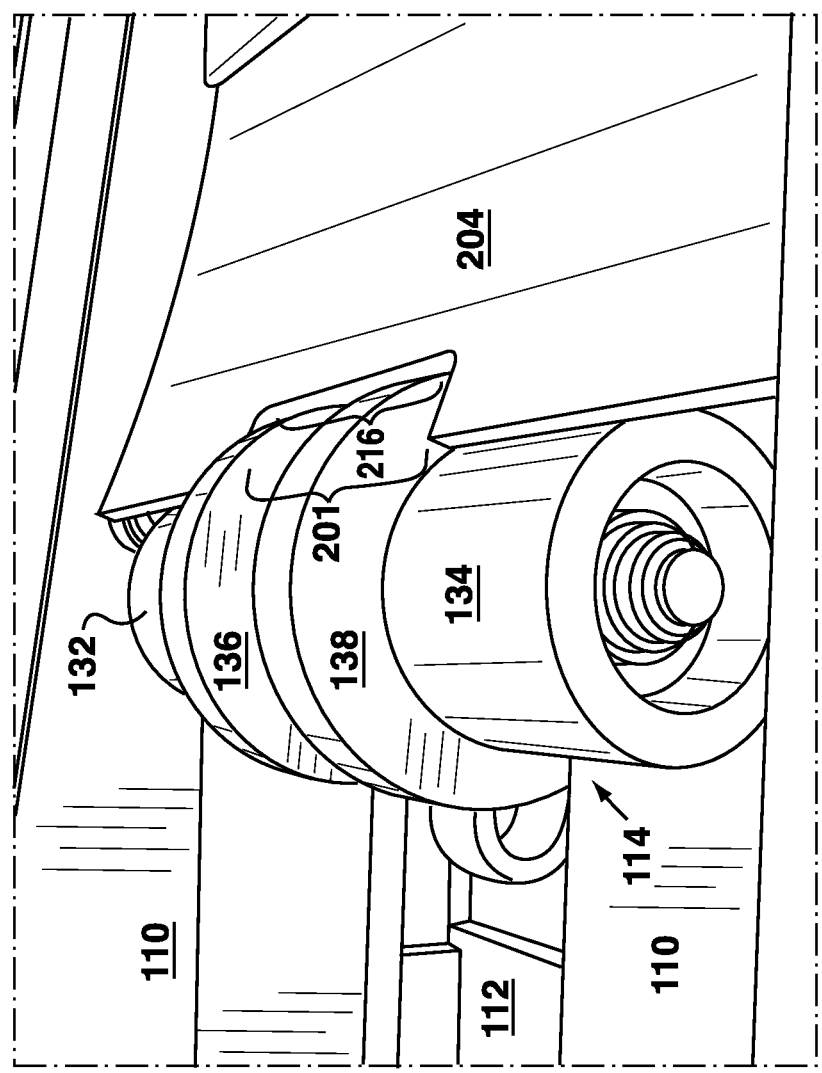
FIG. 13 is a close-up perspective view, from the side of the conveyor of FIG. 1, of a roller opening the safety door of the conveyor.

FIGS. 10-13 show the manner in which the flexible cover 204 flexes when the safety door 210 is opened. In particular, FIG. 10 is a side elevation view of the exit end 106 of the conveyor 100 with the safety door 210 in the open position; FIG. 11 is a perspective view of the exit end 106 of the conveyor 100 of FIG. 10 from below track level; FIG. 12 is a perspective view of the exit end 106 of the conveyor 100 of FIG. 10 from above the conveyor; and FIG. 13 is a close-up perspective view, from above track level, of roller of FIG. 10.

Referring to FIG. 10, it can be seen that the leading (downstream) portions of wheels 134 and 138 of roller 114 are in contact with the safety door 210, with wheel 138 being accommodated within the notch 216 in the safety door 210. The safety door 210 has been pivoted, by the roller 114, into the open position so as to uncover the opening 150. Pivoting of the safety door 210 into the gap 154 causes the trailing (upstream) edge of the safety door 210 to move not only in a downstream direction, but also to rise higher above the surface of the track 110. The latter is due to the relative position of the pivot 164, i.e. offset downstream from and below the safety door 210. Put another way, as the safety door 210 moves across the gap 154, its trailing edge rises upwardly from the surface of the track 110 due to the pivoting of the door 210. The flexibility of the flexible cover 204 allows the cover 204 to flex upwardly and ride up and onto the safety door 210 as the door 210 pivots from the closed position to the open position.

Referring to FIGS. 10 as well as FIGS. 12 and 13, when the safety door 210 has been pushed into the open position, the notch 201 in the overlaying flexible cover 204 overlaps with the notch 216 in the safety door 210. The overlapping notches simultaneously receive the leading portions of pusher wheels 136 and 138. The notch 201 limits a degree of upward flexing of the flexible cover 204 required for passage of the wheels 136, 138 thereunder just before the roller 114 drops through the opening 150, at least in comparison to a similar flexible cover without a notch. The notch 216 in the safety door 210, on the other hand, limits the degree of downstream pivoting of the safety door 210 that is required for the pusher wheels 136, 138 to be able fit between the safety door 210 and the upstream edge 166 of the opening 150 (see FIG. 10; see also FIG. 11), just before the roller 114 drops below track level.

Once the roller 114 has dropped through the opening 150, the safety door 210 is free to fall back (pivot) to the closed position by the operation of gravity, and the flexible cover 204 is free to flex downwardly, also under the influence of gravity, e.g. back to the position shown in FIG. 6. The vehicle wheel 105 may then roll over the flexible cover 204 as it exits the conveyor 100.

It will be appreciated that use of a flexible cover 204 to cover a gap in a vehicle conveyor may be considered counterintuitive, e.g. due to concerns about the ability of the cover to support the weight of the vehicles that may be conveyed over top of the cover. In view of such concerns, conventional wisdom may suggest that covering gaps, such as gap 154, is best done with a rigid cover. However, the inventors have recognized that a fixed rigid cover may create problems in some situations.

For example, in the illustrated embodiment, a rigid cover over top of gap 154 may need to be situated above a surface level of the track in order to allow sufficient room for the safety door 210 to pivot thereunder (recalling that the closed safety door 210 is slightly above track level and further recalling that the trailing edge of the safety door 210 rises as it pivots). A raised rigid cover may effectively constitute a step up from track level for the vehicle wheel. This may be considered disadvantageous for various reasons, e.g. due to additional force possibly being required to cause the vehicle wheel to overcome the step as the wheel moves downstream, due to the potential for momentary suspension of downstream vehicle movement or jerky vehicle motion as the step is encountered, or otherwise.

Alternatively, a hinged rigid cover, which may not need to be raised like a fixed rigid cover to ensure clearance of the safety door thereunder, may require frequent cleaning of the hinged area or eventual hinge replacement due to wear, e.g. of metal upon metal (possibly in the presence of sand or grit, e.g. in a vehicle wash environment) within the hinge. The flexible cover may provide a simple, low maintenance and durable solution which may limit or avoid such potential problems.

It will further be appreciated that, to the extent that flexible covers may be used in known vehicle conveyors to cover apertures in a track from which moving parts (e.g. rollers) emerge, the flexible cover will be attached so that the moving parts move from an attached end of the flexible cover towards a free end of the flexible cover (i.e. from upstream to downstream relative to the direction of movement of the moving part). In contrast, in the illustrated embodiment, the flexible cover is attached so that the moving part encounters the free end of the flexible cover first, in a movement direction that is from the free end of the flexible cover towards the attached end of the flexible cover.

It will be appreciated that the above-illustrated embodiments are illustrative only and that various alternative embodiments could be effected.

For example, in alternative embodiments, either one or both of the flexible cover and the safety door may omit the notches in their upstream edges. Without the notch in the safety door, the degree of pivoting required to open the safety door may increase. Without the notch in the flexible cover, the degree of upward flexing of the flexible cover required for the roller to be able to squeeze between the flexible cover and the upstream edge of the opening may increase. These may be considered acceptable trade-offs in some embodiments.

In the above-described embodiment, the flexible cover 204 is attached to the track 110 by way of an attachment portion 202 that is formed from the same flexible sheet 200 as the flexible cover 204. The manner of attaching the flexible cover to the conveyor may vary in other embodiments. For example, in some embodiments, the attachment portion could be a separate component, such as a bracket or clips that is/are attached to one edge of the flexible cover. Moreover, the attachment point for the flexible cover to the conveyor 100 may not be on the surface of the track 110 (e.g. the attachment portion could somehow be attached to the rails). Further, the cover need not necessarily form part of a larger flexible sheet.

The safety door 210 that is illustrated and described above is an example of a moving part that periodically moves into a gap 154 in a conveyor track. It is possible that alternative conveyor embodiments may have gaps in their tracks and that other forms of moving parts may periodically move fully or partially into such gaps, with at least a portion of the part extending above the surface of the track during at least some of the movement. The movement may be pivoting movement or otherwise. The direction of the movement with respect to the conveyor may be transverse or longitudinal. The moving parts may be, for example, reciprocating members, driving members, actuators, or otherwise. Such gaps with moving parts may pose safety risks similar to those discussed above. To guard against these risks, a flexible cover similar to flexible cover 204 could be used to cover the gaps, with the flexible cover being free to ride up and onto the moving part as it moves within the gap from a free end of the flexible cover towards an attached end of the flexible cover.

The above-described example conveyor is a vehicle wash conveyor. Alternative embodiments of the conveyor could be used for applications other than vehicle wash applications.

Other modifications will be apparent to those skilled in the art and, therefore, the invention is defined in the claims.

What is claimed is:

1. A vehicle conveyor for conveying a wheeled vehicle along a track using a roller, the vehicle conveyor comprising:
    a track;
    an opening in the track for passage of a roller from a surface of the track to an underside of the track;
    a door pivotable between a closed position and an open position, the door covering the opening when in the closed position, the door uncovering the opening when in the open position, the door being pivotable about a pivot that is below track level;
    a gap in the track, adjacent to the opening, for accommodating the door when pivoted to the open position; and
    a flexible cover for covering the gap, the flexible cover being free to ride up and onto at least a portion of the door that extends above a surface of the track as the door pivots from the closed position to the open position.

2. The vehicle conveyor of claim 1 wherein the flexible cover is part of flexible sheet, the flexible sheet having an attachment portion that is attached to the track on an opposite side of the gap from the opening.

3. The vehicle conveyor of claim 2 wherein the flexible sheet is made of ultra-high molecular weight (UHMW) polyethylene.

4. The vehicle conveyor of claim 1 wherein the track has a slot for guiding the roller in a conveyance direction, wherein an upstream edge of the flexible cover, relative to the conveyance direction, has a notch that is transversely aligned with the slot and is sized to accommodate a portion of the roller, the notch for limiting a degree of upward flexing of the flexible cover required for passage of the roller between the flexible cover and an upstream edge of the opening.

5. The vehicle conveyor of claim 4 wherein an upstream edge of the door has a notch sized to accommodate a portion of the roller, the notch in the door overlapping with the notch in the flexible cover when the door is in the open position.

6. The vehicle conveyor of claim 1 wherein the flexible cover at least partially covers the door regardless of whether the door is in the closed position or in the open position.

7. The vehicle conveyor of claim 1 further comprising a tongue extending from the door, in a downstream direction relative to a conveyance direction, the tongue being underneath the flexible cover when the door is in the closed position.

8. A vehicle conveyor for a wheeled vehicle, comprising:
    a track for a wheel of the vehicle;
    a gap in the track;
    a flexible cover for covering the gap, the flexible cover being attached at one end to the track and being free at the other end,
    a moving part operable to move into the gap, from the free end of the flexible cover towards the attached end of the flexible cover, with at least a portion of the moving part protruding above a surface level of the track,
    wherein the flexible cover is adapted to ride up and onto the protruding portion of the moving part while covering the gap.

9. The vehicle conveyor of claim 8, wherein the movement of the moving part is pivoting movement.

10. The vehicle conveyor of claim 8 wherein the moving part is a door for selectively covering an opening in the track adjacent to the gap, the door being pivotable into the gap about a pivot that is below track level.

11. The vehicle conveyor of claim 10 wherein the track has a slot for guiding a roller in a conveyance direction, wherein an upstream edge of the flexible cover, relative to the conveyance direction, has a notch that is aligned with the slot and is sized to accommodate a portion of the roller, the notch for reducing a degree of upward flexing of the flexible cover required for passage of the roller through the opening.

12. The vehicle conveyor of claim 11 wherein an upstream edge of the door, relative to the conveyance direction, comprises a notch sized to accommodate a portion of the roller and wherein the notch in the door overlaps with the notch in the flexible cover when the door has been pivoted into the gap.

13. The vehicle conveyor of claim 10 further comprising a tongue extending from the door underneath the flexible cover.

14. The vehicle conveyor of claim 10 wherein the flexible cover at least partially covers the door regardless of whether the door is in a closed position, covering the opening, or in an open position, in which the door has been pivoted into the gap to uncover the opening.

15. The vehicle conveyor of claim 8 wherein the flexible cover is part of flexible sheet, the flexible sheet having an attachment portion that is attached to the track on an opposite side of the gap from the opening.

16. The vehicle conveyor of claim 8 wherein the gap in the track spans a majority of a width of the track and wherein the flexible cover is adapted to support at least part of the weight of the vehicle when the wheel is over the gap atop the flexible cover.

17. A component of a vehicle wash conveyor, the component comprising:
   a flexible cover sized and shaped for covering a transverse gap in a track of the vehicle wash conveyor, the flexible cover having a notch at one end;
   an attachment portion configured for attaching the flexible cover to the vehicle wash conveyor so that the notch is aligned with a longitudinal slot in the track and so that the flexible cover is free to ride up and onto a moving part that moves into the gap in a direction of movement that is from the notched end of the flexible cover towards the attachment portion.

18. The component of claim 17 wherein the attachment portion comprises a plurality of holes, each hole for receiving a respective fastener for fastening the attachment portion to the track.

19. The component of claim 17 wherein the moving part is a door for covering an opening in the track adjacent to the gap, the opening for passage of a roller from a surface of the track to an underside of the track, and wherein the notch is sized to receive a portion of the roller.

20. The component of claim 17 wherein the attachment portion and the flexible cover comprise a single sheet of flexible material.

21. The component of claim 17 wherein the flexible cover comprises ultra-high molecular weight (UHMW) polyethylene.

22. The component of claim 21 where the UHMW polyethylene comprises a sheet having a thickness that is between about 1/8 inch and about 1/2 inch.

\* \* \* \* \*